US009992096B2

(12) United States Patent
Fan et al.

(10) Patent No.: US 9,992,096 B2
(45) Date of Patent: Jun. 5, 2018

(54) METHOD AND APPARATUS FOR FAST PROTECTION SWITCHING IN MULTICAST

(71) Applicant: Huawei Technologies Co., Ltd., Shenzhen, Guangdong (CN)

(72) Inventors: Fan Fan, Shenzhen (CN); Xudong Liang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 153 days.

(21) Appl. No.: 15/240,844

(22) Filed: Aug. 18, 2016

(65) Prior Publication Data

US 2016/0359723 A1    Dec. 8, 2016

Related U.S. Application Data

(63) Continuation of application No. PCT/CN2015/070040, filed on Jan. 4, 2015.

(30) Foreign Application Priority Data

Feb. 19, 2014    (CN) .......................... 2014 1 0056363

(51) Int. Cl.
  *H04L 1/00*      (2006.01)
  *H04L 12/721*    (2013.01)
  (Continued)

(52) U.S. Cl.
  CPC .............. *H04L 45/12* (2013.01); *H04L 12/18* (2013.01); *H04L 12/6418* (2013.01); *H04L 45/16* (2013.01); *H04L 45/28* (2013.01)

(58) Field of Classification Search
  CPC ......... H04L 45/28; H04L 45/22; H04L 45/00; H04L 1/22; H04L 47/10; H04L 47/30;
  (Continued)

(56) References Cited

U.S. PATENT DOCUMENTS 6,999,422 B2 * 2/2006 Ishioka ............... H04L 43/0852
                                                         370/238
2006/0147204 A1 * 7/2006 Yasukawa ............... H04L 45/12
                                                          398/26
(Continued)

FOREIGN PATENT DOCUMENTS

CN    101656679 A    2/2010
CN    101669105 A    3/2010
(Continued)

OTHER PUBLICATIONS

A Source-Based Algorithm for Delay-Constrained Minimum-Cost Multicasting by Zhu et al.*
(Continued)

*Primary Examiner* — Dady Chery

(57) ABSTRACT

The present invention provides a method for fast protection switching in multicast, where the method includes: determining a primary path and a secondary path to a source node, where the secondary path and the primary path have minimum tail coincidence; receiving, by using both the primary path and the secondary path, multicast traffic replicated by an upstream neighboring node, and replicating multicast traffic received by the primary path to a downstream neighboring node; and if the primary path is faulty, replicating multicast traffic received by the secondary path to the downstream neighboring node. In the present invention, primary and secondary paths can have minimum tail coincidence, which overcomes a problem that fault protection switching in a multicast network requires that primary and secondary paths existing from a routing node to a multicast source are completely separate in physical topology.

20 Claims, 7 Drawing Sheets

(51) Int. Cl.
*H04L 12/64* (2006.01)
*H04L 12/18* (2006.01)
*H04L 12/761* (2013.01)
*H04L 12/703* (2013.01)

(58) Field of Classification Search
CPC ..... H04L 47/11; H04L 47/12; H04L 12/5695; H04L 47/15; H04L 47/2441; H04L 43/50; H04L 12/2697; H04J 3/14; H04Q 11/0478
USPC ...... 370/229–238.1, 248–249, 252; 709/224, 709/231, 239–241, 235
See application file for complete search history.

(56) References Cited

U.S. PATENT DOCUMENTS

2008/0267078 A1 10/2008 Farinacci et al.
2013/0322231 A1 12/2013 Csaszar et al.

FOREIGN PATENT DOCUMENTS

| CN | 102231698 A | 11/2011 |
|---|---|---|
| CN | 103795626 A | 5/2014 |
| WO | 2004071032 A1 | 8/2004 |
| WO | 2013/067111 A1 | 5/2013 |
| WO | 2013/179162 A1 | 12/2013 |

OTHER PUBLICATIONS

Gabor Enyedi et al., "Finding Multiple Maximally Redundant Trees in Linear Time", May 25, 2010, 11 pages, XP-002765664.

Gabor Enyedi et al., "On Finding Maximally Redundant Trees in Strictly Linear Time", IEEE, Jul. 5, 2009, p. 206-211.

A. Karen et al., "Multicast only Fast Re-Route", Network Working Group, Mar. 9, 2012, 15 pages.

A. Atlas et al., "An Architecture for IP/LDP Fast-Reroute Using Maximally Redundant Trees", Routing Area Working Group, Jan. 13, 2014, 29 pages.

B. Fenner et al., "Protocol Independent Multicast-Sparse Mode (PIM-SM): Protocol Specification (Revised)", Aug. 2006, 112 pages.

A. Karan et al., "Multicast only Fast Re-Route", Network Working Group, Oct. 2, 2012, 15 pages.

* cited by examiner

METHOD AND APPARATUS FOR FAST PROTECTION SWITCHING IN MULTICAST

CROSS-REFERENCE TO RELATED APPLICATIONS

This application is a continuation of International Application No. PCT/CN2015/070040, filed on Jan. 4, 2015, which claims priority to Chinese Patent Application No. 201410056363.7, filed on Feb, 19, 2014, both of which are hereby incorporated by reference in their entireties.

TECHNICAL FIELD

The present invention relates to a communications technology, and in particular, to a method and an apparatus for fast protection switching in multicast.

BACKGROUND

An Internet Protocol television (IPTV) and an evolved multimedia broadcast multicast service (eMBMS) generally use a multicast technology to effectively reduce pressures on devices and bandwidths. In the IPTV and the eMBMS, a multicast source (source) of an operator center sends traffic in a multicast manner to a provider edge router (PE) connected to a user side, so that the PE may further forward the traffic to the user side.

IP multicast protocols mainly include an Internet Group Management Protocol (IGMP) that is used for host registration and used for a user side host to send an IGMP join packet to a PE to perform registration, and a Multicast Routing Protocol that is used for multicast routing and forwarding. The Multicast Routing Protocol generally uses Protocol Independent Multicast (PIM). The PIM Protocol is independent of a unicast routing protocol provided that the unicast routing protocol can generate a routing entry.

In the prior art, multicast only fast reroute (MoFRR) is generally used for implementing fault switchover, so as to reduce service interruption caused by a fault of an Internet Protocol (IP) network that bears multicast traffic. MoFRR is applied to a PE node, and requires that two paths that are completely separate in physical topology (topo) exist from a PE to a multicast source. The PE sends a PIM join (join) packet to an upstream node of either of a primary (primary) path and a secondary (secondary) path to join a multicast routing network, and then receives, by using both of the two paths, multicast traffic sent by the multicast source. Normally, after receiving the traffic, the PE performs reverse path forwarding (RPF) check according to the primary path; if traffic received by the primary path passes the RPF check, the traffic received by the primary path is forwarded to a user side (Receiver); if traffic received by the secondary path does not pass the RPF check, the traffic received by the secondary path is directly discarded. When the primary path is faulty, the PE performs RPF check according to the secondary path, so that the traffic received by the PE from the secondary path can pass the RPF check and is not discarded, so as to ensure that the user side can normally receive traffic.

However, once the PE does not have a primary path and a secondary path to the multicast source that are completely separate in physical topo, the foregoing solution cannot be used for performing fault switchover.

SUMMARY

The present invention provides a method and an apparatus for fast protection switching in multicast, so as to overcome a problem in the prior art that fault protection switching in multicast requires that primary and secondary paths existing from a routing node to a multicast source are completely separate in physical topology.

According to a first aspect, an embodiment of the present invention provides a method for fast protection switching in multicast, where the method includes:

determining a primary path and a secondary path to a source node, where the secondary path and the primary path have minimum tail coincidence;

receiving, by using both the primary path and the secondary path, multicast traffic replicated by an upstream neighboring node, and replicating multicast traffic received by the primary path to a downstream neighboring node; and if the primary path is faulty, replicating multicast traffic received by the secondary path to the downstream neighboring node.

In a first possible implementation manner of the first aspect, the determining a primary path and a secondary path to a source node, where the secondary path and the primary path have minimum tail coincidence includes:

determining a shortest path to the source node as the primary path;

determining whether a path to the source node exists exclusive of the primary path; and if at least one path to the source node exists exclusive of the primary path, using a shortest path of the at least one path to the source node as the secondary path; or if the path to the source node does not exist exclusive of the primary path, using a last hop Nx of the primary path as a last hop of the secondary path, and performing the step of determining the secondary path to the source node.

According to the first possible implementation manner of the first aspect, in a second possible implementation manner, the method further includes:

if the last hop Nx of the primary path is used as the last hop of the secondary path and the secondary path to the source node does not exist, using last two hops of the primary path as last two hops of the secondary path, and performing the step of determining the secondary path; and if the last two hops of the primary path are used as the last two hops of the secondary path and the secondary path to the source node does not exist, deducing the rest by analogy until the secondary path to the source node is determined.

According to the first or second possible implementation manner of the first aspect, in a third possible implementation manner of the first aspect, after the determining the secondary path to the source node, the method further includes:

forming a first set by using all nodes on the secondary path;

using the last hop Nx of the primary path as a root, determining all subtrees on a reverse shortest path tree (RSPT) that uses the last hop Nx of the primary path as the root, and forming a second set by using nodes on all the subtrees;

if an intersection set of the second set and the first set is not empty, determining a farthest node Nj on the secondary path in the intersection set; and replacing the secondary path with a path formed by using all nodes on a subtree of the node Nj on the RSPT and all nodes between the node Nj and the source node on the secondary path, and using the formed path as a final secondary path to the source node.

In a fourth possible implementation manner of the first aspect, the receiving, by using both the primary path and the secondary path, multicast traffic replicated by an upstream neighboring node, and replicating multicast traffic received by the primary path to a downstream neighboring node includes:

using an interface between the primary path and the upstream neighboring node as a master input, and using an interface between the secondary path and the upstream neighboring node as a backup input;

receiving, by using the master input, the multicast traffic replicated by the upstream neighboring node, receiving, by using the backup input, the multicast traffic replicated by the upstream neighboring node, and replicating the multicast traffic received by the master input to the downstream neighboring node; and the if the primary path is faulty, replicating multicast traffic received by the secondary path to the downstream neighboring node includes:

if the master input is faulty, replicating the multicast traffic received by the backup input to the downstream neighboring node.

According to the fourth possible implementation manner of the first aspect, in a fifth possible implementation manner of the first aspect, after the using an interface between the primary path and the upstream neighboring node as a master input, and using an interface between the secondary path and the upstream neighboring node as a backup input, the method further includes:

receiving a PIM join packet;

determining whether an interface receiving the PIM join packet is a master input; and if the interface receiving the PIM join packet is not a master input, marking the interface as a master output;

the replicating the multicast traffic received by the master input to the downstream neighboring node includes: replicating, by using the master output, the multicast traffic received by the master input to the downstream neighboring node; and the if the master input is faulty, replicating the multicast traffic received by the backup input to the downstream neighboring node includes:

switching the backup input to a master input, and replicating, by using the master output, the multicast traffic received by the backup input that has not undergone switching to the downstream neighboring node.

According to the fifth possible implementation manner of the first aspect, in a sixth possible implementation manner of the first aspect, the method further includes: if the interface receiving the PIM join packet is a master input, marking the interface as a backup output; and after the receiving, by using the backup input, the multicast traffic replicated by the upstream neighboring node, the method further includes:

if the master input is not faulty, replicating, by using the backup output, the multicast traffic received by the backup input to the downstream neighboring node.

According to the sixth possible implementation manner of the first aspect, in a seventh possible implementation manner of the first aspect, after the receiving a PIM join packet, the method further includes:

determining whether a master output and/or backup output exists; and if the master output exists, sending a PIM join packet to the upstream neighboring node by using the master input; and/or, if the backup output exists, sending a PIM join packet to the upstream neighboring node by using the backup input.

According to any one of the fifth to seventh possible implementation manners of the first aspect, in an eighth possible implementation manner of the first aspect, the method further includes:

receiving a PIM prune message;

deleting an outbound interface receiving the PIM prune message, where the outbound interface receiving the PIM prune message is a master output or backup output;

determining whether a master output and/or backup output exists; and if the master output does not exist, sending a PIM prune message to the upstream node by using the master input, and/or if the backup output does not exist, sending a PIM prune message to the upstream neighboring node by using the backup input.

According to any one of the fourth to eighth possible implementation manners of the first aspect, in a ninth possible implementation manner of the first aspect, after the receiving, by using the master input, the multicast traffic replicated by the upstream neighboring node, and receiving, by using the backup input, the multicast traffic replicated by the upstream neighboring node, and before the replicating the multicast traffic received by the master input to the downstream neighboring node, the method further includes:

performing, according to the primary path, reverse path forwarding RPF check on the multicast traffic replicated by the upstream neighboring node and received by the master input; and performing, according to the secondary path, reverse path forwarding RPF check on the multicast traffic replicated by the upstream neighboring node and received by the backup input.

According to any one of the sixth to ninth possible implementation manners of the first aspect, in a tenth possible implementation manner of the first aspect, before the if the master input is not faulty, replicating, by using the backup output, the multicast traffic received by the backup input to the downstream neighboring node, the method further includes:

determining whether a backup output exists; and if the backup output does not exist, discarding the multicast traffic received by the backup input.

According to any one of the sixth to tenth possible implementation manners of the first aspect, in an eleventh possible implementation manner of the first aspect, the method further includes:

if the master input changes, replicating, by using the master output, multicast traffic received by a new master input to the downstream neighboring node;

determining whether the old master input is a new backup input; and if the old master input is a new backup input, switching the old master input to the backup input, and replicating, by using a backup output, the multicast traffic received by the old master input that has not undergone switching to the downstream neighboring node; or if the old master input is not a new backup input, sending a PIM prune message to the old master input, deleting the old master input, and discarding the multicast traffic received by the old master input.

According to any one of the sixth to eleventh possible implementation manners of the first aspect, in a twelfth possible implementation manner of the first aspect, the method further includes:

if a backup output needs to be switched to a master output, switching the backup output to the master output immediately; and if a master output needs to be switched to a backup output, switching the master output to the backup output in a delayed manner.

According to a second aspect, an embodiment of the present invention provides an apparatus for fast protection switching in multicast, where the apparatus includes:

a path determining module, configured to determine a primary path and a secondary path to a source node, where the secondary path and the primary path have minimum tail coincidence;

a multicast processing module, configured to receive, by using both the primary path and the secondary path, multicast traffic replicated by an upstream neighboring node, and replicate multicast traffic received by the primary path to a downstream neighboring node; and a fault processing module, configured to: if the primary path is faulty, replicate multicast traffic received by the secondary path to the downstream neighboring node.

In a first possible implementation manner of the second aspect, the path determining module is specifically configured to:

determine a shortest path to the source node as the primary path;

determine whether a path to the source node exists exclusive of the primary path; and if at least one path to the source node to the source node exists exclusive of the primary path, use a shortest path of the at least one path to the source node as the secondary path; or if the path to the source node does not exist exclusive of the primary path, use a last hop Nx of the primary path as a last hop of the secondary path, and perform the step of determining the secondary path to the source node.

According to the first possible implementation manner of the second aspect, in a second possible implementation manner, the path determining module is further configured to:

if the last hop Nx of the primary path is used as the last hop of the secondary path and the secondary path to the source node does not exist, use last two hops of the primary path as last two hops of the secondary path, and perform the step of determining the secondary path; and if the last two hops of the primary path are used as the last two hops of the secondary path and the secondary path to the source node does not exist, deduce the rest by analogy until the secondary path to the source node is determined.

According to the first or second possible implementation manner of the second aspect, in a third possible implementation manner of the second aspect, the path determining module is further configured to: after determining the secondary path to the source node, form a first set by using all nodes on the secondary path;

use the last hop Nx of the primary path as a root, determine all subtrees on a RSPT that uses the last hop Nx of the primary path as the root, and form a second set by using nodes on all the subtrees;

if an intersection set of the second set and the first set is not empty, determine a farthest node Nj on the secondary path in the intersection set; and replace the secondary path with a path formed by using all nodes on a subtree of the node Nj on the RSPT and all nodes between the node Nj and the source node on the secondary path, and use the formed path as a final secondary path to the source node.

In a fourth possible implementation manner of the second aspect, the multicast processing module includes:

an interface processing unit, configured to use an interface between the primary path and the upstream neighboring node as a master input, and use an interface between the secondary path and the upstream neighboring node as a backup input;

a traffic processing unit, configured to receive, by using the master input, the multicast traffic replicated by the upstream neighboring node, receive, by using the backup input, the multicast traffic replicated by the upstream neighboring node, and replicate the multicast traffic received by the master input to the downstream neighboring node; and the fault processing module is specifically configured to:

if the master input is faulty, replicate the multicast traffic received by the backup input to the downstream neighboring node.

According to the fourth possible implementation manner of the second aspect, in a fifth possible implementation manner of the second aspect, the interface processing unit is further configured to: after using the interface between the primary path and the upstream neighboring node as the master input, and using the interface between the secondary path and the upstream neighboring node as the backup input, receive a PIM join packet;

determine whether an interface receiving the PIM join packet is a master input; and if the interface receiving the PIM join packet is not a master input, mark the interface as a master output;

the traffic processing unit is specifically configured to:

replicate, by using the master output, the multicast traffic received by the master input to the downstream neighboring node; and the fault processing module is specifically configured to:

switch the backup input to a master input, and replicate, by using the master output, the multicast traffic received by the backup input that has not undergone switching to the downstream neighboring node.

According to the fifth possible implementation manner of the second aspect, in a sixth possible implementation manner of the second aspect, the interface processing unit is further configured to:

if the interface receiving the PIM join packet is a master input, mark the interface as a backup output; and the traffic processing unit is further configured to: after receiving, by using the backup input, the multicast traffic replicated by the upstream neighboring node, if the master input is not faulty, replicate, by using the backup output, the multicast traffic received by the backup input to the downstream neighboring node.

According to the sixth possible implementation manner of the second aspect, in a seventh possible implementation manner of the second aspect, the interface processing unit is further configured to: after the receiving a PIM join packet, determine whether a master output and/or backup output exists; and if the master output exists, send a PIM join packet to the upstream neighboring node by using the master input; and/or, if the backup output exists, send a PIM join packet to the upstream neighboring node by using the backup input.

According to any one of the fifth to seventh possible implementation manners of the second aspect, in an eighth possible implementation manner of the second aspect, the interface processing unit is further configured to:

receive a PIM prune message;

delete an outbound interface receiving the PIM prune message, where the outbound interface receiving the PIM prune message is a master output or backup output;

determine whether a master output and/or backup output exists; and if the master output does not exist, send a PIM prune message to the upstream node by using the master input, and/or if the backup output does not exist, send a PIM prune message to the upstream neighboring node by using the backup input.

According to any one of the fourth to eighth possible implementation manners of the second aspect, in a ninth possible implementation manner of the second aspect, the traffic processing unit is further configured to: after receiving, by using the master input, the multicast traffic replicated by the upstream neighboring node, and receiving, by using the backup input, the multicast traffic replicated by the upstream, neighboring node, and before replicating the multicast traffic received by the master input to the downstream neighboring node, perform, according to the primary path, reverse path forwarding RPF check on the multicast traffic replicated by the upstream neighboring node and received by the master input; and perform, according to the secondary path, reverse path forwarding RPF check on the multicast traffic replicated by the upstream neighboring node and received by the backup input.

According to any one of the sixth to ninth possible implementation manners of the second aspect, in a tenth possible implementation manner of the second aspect, the traffic processing unit is further configured to: before replicating, by using the backup output, the multicast traffic received by the backup input to the downstream neighboring node if the master input is not faulty, determine whether a backup output exists; and if the backup output does not exist, discard the multicast traffic received by the backup input.

According to any one of the sixth to tenth possible implementation manners of the second aspect, in an eleventh possible implementation manner of the second aspect, the interface processing unit is further configured to:

if the master input changes, replicate, by using the master output, multicast traffic received by a new master input to the downstream neighboring node;

determine whether the old master input is a new backup input; and if the old master input is a new backup input, switch the old master input to the backup input, and the traffic processing unit is further configured to:

replicate, by using a backup output, the multicast traffic received by the old master input that has not undergone switching to the downstream neighboring node; or if the old master input is not a new backup input, send a PIM prune message to the old master input, and delete the old master input, and the traffic processing unit is further configured to:

discard the multicast traffic received by the old master input.

According to any one of the sixth to eleventh possible implementation manners of the second aspect, in a twelfth possible implementation manner of the second aspect, the interface processing unit is further configured to:

if a backup output needs to be switched to a master output, switch the backup output to the master output immediately; and if a master output needs to be switched to a backup output, switch the master output to the backup output in a delayed manner.

According to a third aspect, an embodiment of the present invention provides a network device, including the apparatus for fast protection switching in multicast according to any one of the second aspect and the first to twelfth possible implementation manners of the second aspect.

Based on the foregoing solutions, in the embodiments of the present invention, primary and secondary paths can have minimum tail coincidence, which overcomes a problem that fault protection switching in a multicast network requires that primary and secondary paths existing from a routing node to a multicast source are completely separate in physical topology, and expands an area that the fault protection switching in the multicast network can cover.

BRIEF DESCRIPTION OF THE DRAWINGS

To describe the technical solutions in the embodiments of the present invention more clearly, the following briefly introduces the accompanying drawings required for describing the implementation manners. Apparently, the accompanying drawings in the following description show merely some embodiments of the present invention, and persons of ordinary skill in the art may still derive other drawings from these accompanying drawings without creative efforts.

FIG. 3a is a schematic diagram of interface roles of nodes in the diagram of the network topology shown in FIG. 1a;

FIG. 3b is a schematic diagram of an interface role of any node in the diagram of the network topology shown in FIG. 1a;

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
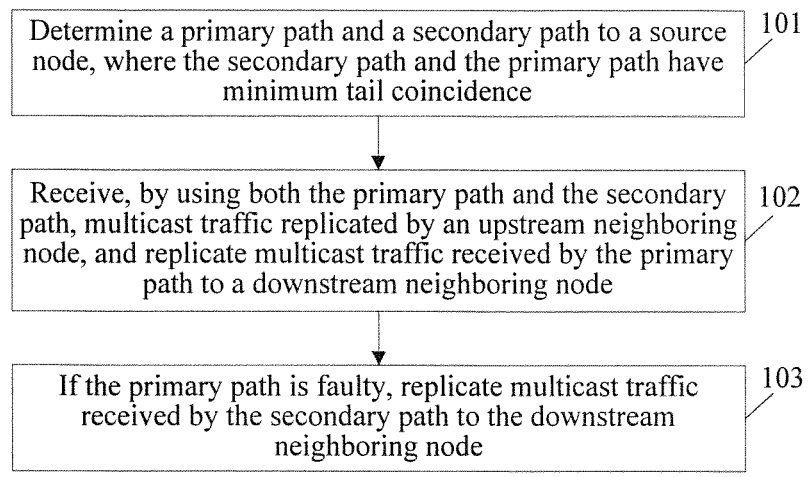
FIG. 1 is a flowchart of Embodiment 1 of a method for fast protection switching in multicast according to the present invention.

FIG. 1 is a flowchart of Embodiment 1 of a method for fast protection switching in multicast according to the present invention. As shown in FIG. 1, the method embodiment includes:

Step 101: Determine a primary path and a secondary path to a source node, where the secondary path and the primary path have minimum tail coincidence, where the minimum tail coincidence refers to that nodes at a tail end of the primary path coincide with nodes at a tail end of the secondary path, and a quantity of the coinciding nodes is minimum.

Step 102: Receive, by using both the primary path and the secondary path, multicast traffic replicated by an upstream neighboring node, and replicate multicast traffic received by the primary path to a downstream neighboring node.

Step 103: If the primary path is faulty, replicate multicast traffic received by the secondary path to the downstream neighboring node.

In step 102, before the multicast traffic is received, a Protocol Independent Multicast PIM join packet needs to be sent to the upstream neighboring node of the primary path and the upstream neighboring node of the secondary path, so as to join a multicast routing network, so that the upstream neighboring node replicates the multicast traffic to a current node. Moreover, a PIM join packet or an IGMP join packet sent by the downstream neighboring node is received, and the received multicast traffic is sent to the downstream neighboring node.

Further, in step 101, the determining a primary path and a secondary path to a source node, where the secondary path and the primary path have minimum tail coincidence includes:

determining a shortest path to the source node as the primary path;

determining whether a path to the source node exists exclusive of the primary path; and if the path to the source node exists exclusive of the primary path, using a shortest path of the path as the secondary path, where the shortest path is a path having a minimum link cost (cost); or if the path to the source node does not exist exclusive of the primary path, using a last hop of the primary path as a last hop of the secondary path, and performing the step of determining the secondary path to the source node;

if the last hop Nx of the primary path is used as the last hop of the secondary path and the secondary path to the source node does not exist, using last two hops of the primary path as last two hops of the secondary path, and performing the step of determining the secondary path; and if the last two hops of the primary path are used as the last two hops of the secondary path and the secondary path to the source node does not exist, deducing the rest by analogy until the secondary path to the source node is determined.

Figure 1A:
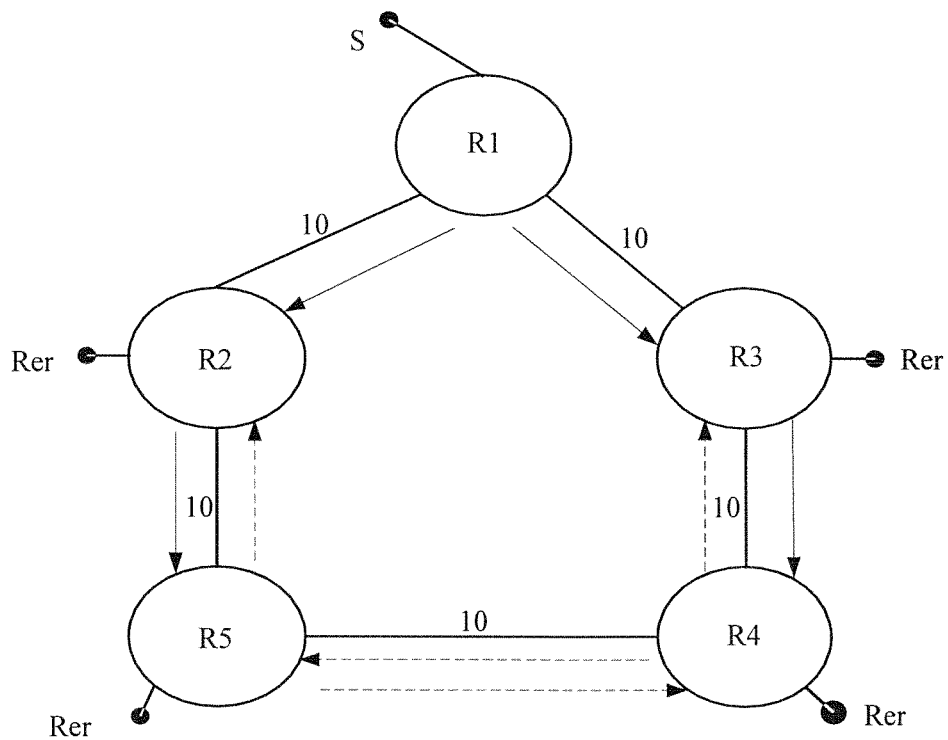
FIG. 1a is a diagram of a network topology to which the method embodiment shown in FIG. 1 is applicable.

FIG. 1a is a diagram of a network topology to which the method embodiment shown in FIG. 1 is applicable. A scenario in which inbound and outbound link costs are inconsistent does not exist in this network topology. The method embodiment is described by using FIG. 1a as an example. As shown in FIG. 1a, the diagram of the network topology includes a source node S, where the source node may be a multicast source or may be a rendezvous point (RP) in a multicast network, routing nodes R1 to R5, and a receiver (Rer) of each routing node. In this embodiment of the present invention, R denotes a routing node, S denotes the source node, Rer denotes a receiver connected to R, and details are not described herein again. As shown in FIG. 1a, inbound and outbound link costs (cost) between the routing nodes are the same, such as, are all 10, where R1 is directly connected to S, and has no secondary path, and a routing node having no secondary path is not within the limitation scope of the present invention. It should be noted that this embodiment of the present invention is also applicable to another complex network topology in which link costs of routing nodes are different but inbound and outbound link costs are consistent, and whose implementation principle is similar, and details are not described herein again.

Specifically, the method embodiment may be performed by any routing node including an edge routing node in a multicast routing network. The routing node R4 is used as an example, R4 determines, after it is determined that a primary path is R3-R1, whether a path to the source node S exists exclusive of all nodes on the primary path: if exists, using a shortest path of the path as a secondary path from R4 to the source node S, or if does not exist, using a last hop R1 of the primary path as a last hop of the secondary path; and determines whether a path passing through the last hop to the source node S exists: if exists, using a shortest path of the path as a secondary path from R4 to the source node, which is R5-R2-R1 in this case, or if does not exist, continuing to using last two hops of the primary path as last two hops of the secondary path, and deducing the rest by analogy until the secondary path to the source node S is determined. For other nodes of R2 to R5, primary and secondary paths from the nodes to the source node S may be also similarly determined, details are not described herein again, and nodes on the primary and secondary paths of the nodes are shown in the following Table 1.

After the primary and secondary paths are determined, each node separately sends a PIM join packet to an upstream neighboring node of the primary and secondary paths, so that after receiving multicast traffic, the upstream neighboring node of the primary and secondary paths replicates the multicast traffic to a downstream neighboring node of the primary and secondary paths, so as to ensure that each node can receive two copies of same multicast traffic from both the primary and secondary paths, where multicast traffic received by primary and secondary paths is denoted by an arrowed straight line shown in FIG. 1a, an arrow denotes a traffic receiving direction, a solid-line arrow denotes multicast traffic received from a primary path, and a dashed-line arrow denotes multicast traffic received from a secondary path. In a case in which the primary path is not faulty, multicast traffic received from the primary path is sent to a receiver Rer and the downstream neighboring node of the primary path. If the primary path is faulty, a node nearest to a fault, which may be also referred to as a fault point, directly and rapidly perceives occurrence of the fault, immediately switches the secondary path to a primary path, and sends multicast traffic received by the secondary path that has not undergone switching to the receiver Rer and the downstream neighboring node of the primary path, so that the receiver Rer and the downstream neighboring node on the primary path do not need to perceive occurrence of the fault, and can still receive multicast traffic from the primary path, which does not cause multicast service interruption, thereby implementing fast protection switching in multicast.

it should be noted that, the method embodiment is also applicable to routing nodes of primary and secondary paths that are completely separate in physical topology, and in this embodiment of the present invention, after the routing nodes receive two copies of same multicast traffic by using the primary and secondary paths, an assert (assert) mechanism is not triggered to perform selection, and details are not described herein again.

TABLE 1

Node list that is of primary and secondary paths of R2 to R5 in FIG. 1a and determined according to the method embodiment shown in FIG. 1

| Node | Primary path | Secondary path |
|------|--------------|----------------|
| R2   | R1           | R5-R4-R3-R1    |
| R3   | R1           | R4-R5-R2-R1    |
| R4   | R3-R1        | R5-R2-R1       |
| R5   | R2-R1        | R4-R3-R1       |

Conventional MoFRR is mainly deployed on an edge routing node PE, and when fast protection in multicast is implemented, it must be required that primary and secondary paths from a protected routing node to a source node are completely separate in physical topology. In FIG. 1a, routing nodes R2 to R5 in annular networking do not have a primary path and a secondary path that are completely physically separate, and therefore MoFRR cannot be used for performing fast protection in multicast.

In the method embodiment, primary and secondary paths can have minimum tail coincidence, which overcomes a problem that fault protection switching in a multicast network requires that primary and secondary paths existing from a routing node to a multicast source are completely separate in physical topology, and expands an area that the fault protection switching in the multicast network can cover.

Figure 2:
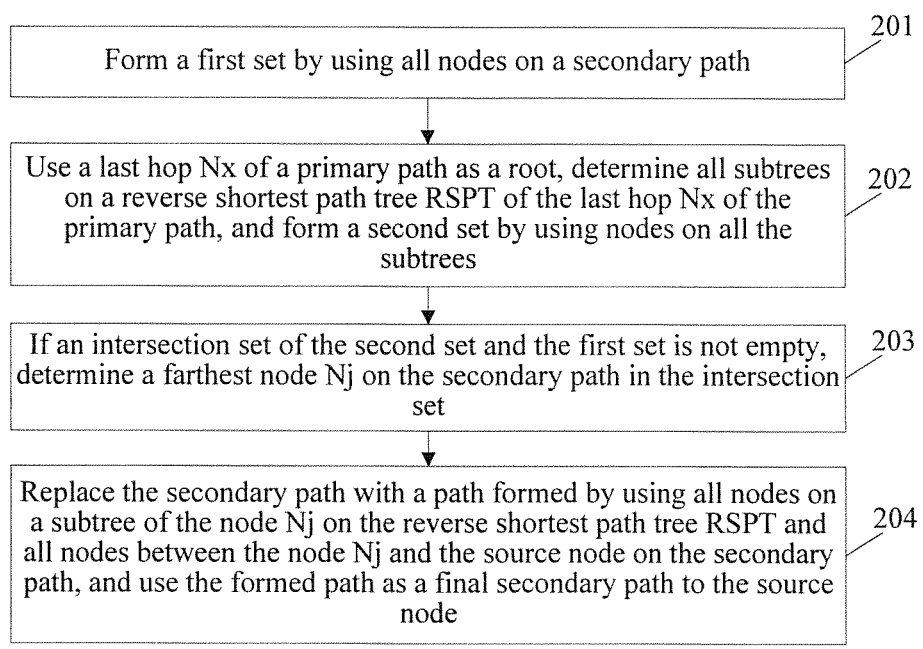
FIG. 2 is a flowchart of Embodiment 2 of a method for fast protection switching in multicast according to the present invention.

FIG. 2 is a flowchart of Embodiment 2 of a method for fast protection switching in multicast according to the present invention. The method embodiment is an exemplary implementation manner of determining a secondary path to a source node in step 101 in the method embodiment shown in FIG. 1, so as to cover a scenario in which inconsistent inbound and outbound link costs between routing nodes may exist in a multicast network. As shown in FIG. 2, the method embodiment includes the following steps:

Step 201: Form a first set by using all nodes on a secondary path.

Step 202: Use a last hop Nx of a primary path as a root, determine all subtrees on a reverse shortest path tree RSPT that uses the last hop Nx of the primary path as the root, and form a second set by using nodes on all the subtrees.

Step 203: If an intersection set of the second set and the first set is not empty, determine a farthest node Nj on the secondary path in the intersection set.

Step 204: Replace the secondary path with a path formed by using all nodes on a subtree of the node Nj on the reverse shortest path tree RSPT and all nodes between the node Nj and the source node on the secondary path, and use the formed path as a final secondary path to the source node.

Figure 2A:
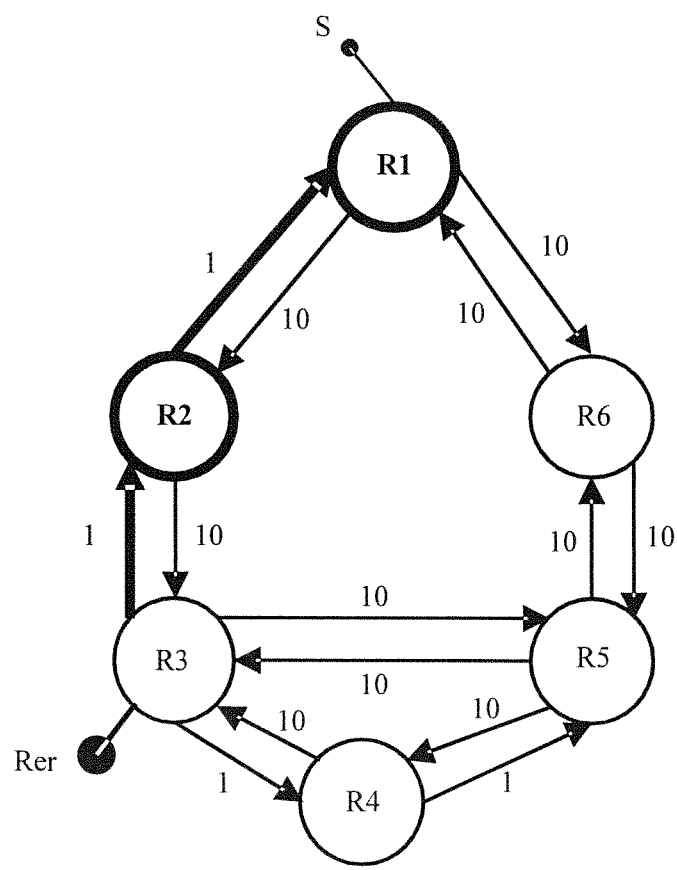
FIG. 2a is a diagram of a network topology to which the method embodiment shown in FIG. 2 is applicable.

FIG. 2a is a diagram of a network topology to which the method embodiment shown in FIG. 2 is applicable. As shown in FIG. 2a, in the network topology, a situation in which inbound and outbound link costs are not the same exists in routing nodes R2 to R6. As shown by the routing nodes R3 and R4 in FIG. 2a, both a link cost from R3 to R4 and a link cost from R4 to R5 are 1, and both reverse link costs corresponding to these nodes are 10; likewise, both a link cost from R1 to R2 and a link cost from R2 to R3 are 10, and both reverse link costs corresponding to these nodes are 1.

Figure 2B:
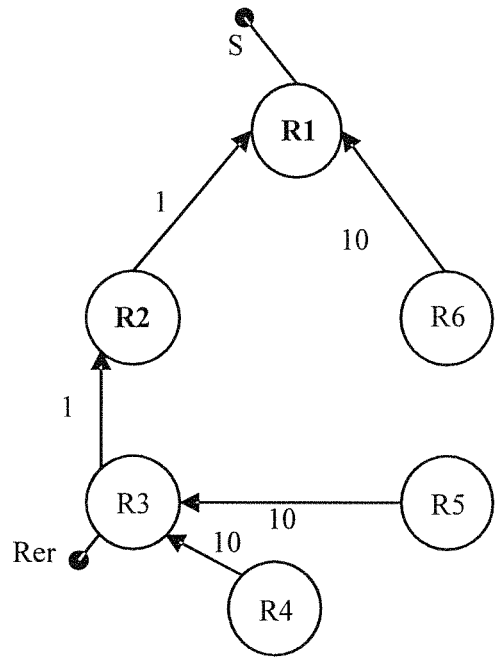
FIG. 2b is a schematic diagram of determining a reverse shortest path tree RSPT in the method embodiment shown in FIG. 2.

Specifically, the routing node R3 in FIG. 2a is used as an example to describe a process of determining a final secondary path in the method embodiment, the process is similar for other routing nodes, and details are not described herein again. R3 is used as a current node Ni. Primary and secondary paths of the node R3 may be determined first according to the step of determining primary and secondary paths in the method embodiment shown in FIG. 1, where specific processes are similar and details are not described herein again. The primary path of R3: R2-R1 and the secondary path of R3: R4-R5-R6-R1 are obtained, where the secondary path is referred to as a shortest path tree (SPT) secondary path, and a first set is formed by using all nodes on the SPT secondary path, and is marked as a set P, where P={R4, R5, R6, R1}. Then a last hop Nx of the primary path, that is, the node R1 is used as a root, all subtrees of R3 on a reverse shortest path tree (RSPT) using Nx as the root are determined, and in this case all the subtrees of R3 are R4 and R5. As shown in FIG. 2b, a second set is formed by using nodes on all the subtrees, and is marked as a set Q, where Q={R4, R5}. Then, P∩Q={R4, R5} may be obtained by calculating an intersection set of the first set and the second set, and is not empty. Then, a node Nj farthest from R3 on the current secondary path in the intersection set is determined, and in this case, that Nj is R5 is easily obtained. Finally, a path formed by using all nodes on a subtree from R3 to R5 on an RSPT path, and all nodes between R5 and S on the current secondary path, which is R5-R6-R1 in this case, replaces the current secondary path and is used as a final secondary path from R3 to S.

It should be noted that, if an equal cost multipath (ECMP) scenario exists, when primary and secondary paths are selected, hash (hash) calculation needs to be performed by using a rule as follows when calculating an SPT path and encountering ECMP, any point Ni performs hash based on an Internet group (group), where the hash rule is uniform in the entire network; when calculating an RSPT and encountering ECMP, any point Nx uses a hash rule the same as that for calculating an SPT, so as to ensure that a path calculation result of any node Ni on the RSPT is consistent with an SPT path calculated by Ni; and when any point Ni calculates a secondary path, if a primary path is in an ECMP scenario, provided that the primary path selected by performing hash based on the group is excluded, alternative topology calculation may be performed on another ECMP path to determine the secondary path.

It should be noted that, the method embodiment is also applicable to the network topology shown in FIG. 1a in which consistent inbound and outbound link costs exist, and in this case, a final secondary path determined by using the method embodiment is the same as a secondary path determined by using the method embodiment shown in FIG. 1.

The method embodiment may implement full scenario coverage of fault protection switching on the basis of the method embodiment shown in FIG. 1 by determining a final secondary path.

Figure 3:
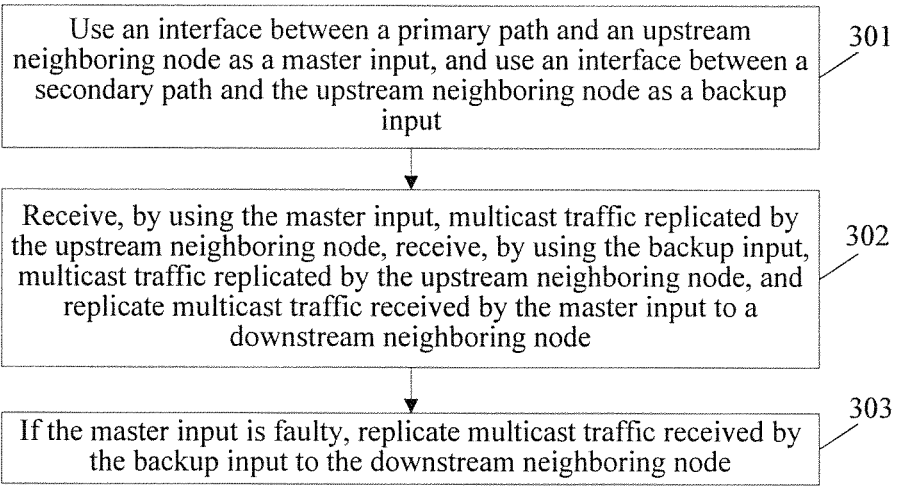
FIG. 3 is a flowchart of Embodiment 3 of a method for fast protection switching in multicast according to the present invention.

FIG. 3 is a flowchart of Embodiment 3 of a method for fast protection switching in multicast according to the present invention. A definition of a role of an interface between a current node and a neighboring node is added in the method embodiment on the basis of the method embodiment shown in FIG. 1 or FIG. 2, and the method embodiment is an implementation manner obtained after a definition of a role of an interface is added in step 102 and step 103 in the method embodiment shown in FIG. 1. As shown in FIG. 3, the method embodiment includes the following steps:

Step 301: Use an interface between a primary path and an upstream neighboring node as a master input, and use an interface between a secondary path and the upstream neighboring node as a backup input.

Step 302: Receive, by using the master input, multicast traffic replicated by the upstream neighboring node, receive, by using the backup input, multicast traffic replicated by the upstream neighboring node, and replicate multicast traffic received by the master input to a downstream neighboring node.

Step 303: If the master input is faulty, replicate multicast traffic received by the backup input to the downstream neighboring node.

Further, after step 301, the method further includes:
receiving a PIM join packet;
determining whether an interface receiving the PIM join packet is a master input; and
if the interface receiving the PIM join packet is not a master input, marking the interface as a master output;
the replicating the multicast traffic received by the master input to the downstream neighboring node includes: replicating, by using the master output, the multicast traffic received by the master input to the downstream neighboring node; and
the if the master input is faulty, replicating the multicast traffic received by the backup input to the downstream neighboring node includes:
switching the backup input to a master input, and replicating, by using the master output, the multicast traffic received by the backup input that has not undergone switching to the downstream neighboring node; or
if the interface receiving the PIM join packet is a master input, marking the interface as a backup output; and
after the receiving, by using the backup input, multicast traffic replicated by the upstream neighboring node, the method further includes:
if the master input is not faulty, replicating, by using the backup output, the multicast traffic received by the backup input to the downstream neighboring node.

Preferably, after the receiving a PIM join packet, the method further includes:
determining whether a master output and/or backup output exists; and
if the master output exists, sending a PIM join packet to the upstream neighboring node by using the master input; and/or, if the backup output exists, sending a PIM join packet to the upstream neighboring node by using the backup input.

Optionally, the method embodiment further includes:
receiving a PIM prune message;
deleting an outbound interface receiving the PIM prune message, where the outbound interface receiving the PIM prune message is a master output or backup output;
determining whether a master output and/or backup output exists; and
if the master output does not exist, sending a PIM prune message to the upstream node by using the master input, and/or if the backup output does not exist, sending a PIM prune message to the upstream neighboring node by using the backup input.

Further, in step 302, after the multicast traffic replicated by the upstream neighboring node is received by using the master input, and the multicast traffic replicated by the upstream neighboring node is received by using the backup input, and before the multicast traffic received by the master input is replicated to the downstream neighboring node, the method further includes:

performing, according to the primary path, reverse path forwarding RPF check on the multicast traffic replicated by the upstream neighboring node and received by the master input; and
performing, according to the secondary path, reverse path forwarding RPF check on the multicast traffic replicated by the upstream neighboring node and received by the backup input.

Further, before the multicast traffic received by the backup input is replicated to the downstream neighboring node by using the backup output if the master input is not faulty, the method further includes:
determining whether a backup output exists; and
if the backup output does not exist, discarding the multicast traffic received by the backup input.

Optionally, the method embodiment further includes:
if the master input changes, replicating, by using the master output, multicast traffic received by a new master input to the downstream neighboring node;
determining whether the old master input is a new backup input; and
if the old master input is a new backup input, switching the old master input to the backup input, and replicating, by using a backup output, the multicast traffic received by the old master input that has not undergone switching to the downstream neighboring node; or
if the old master input is not a new backup input, sending a PIM prune message to the old master input, deleting the old master input, and discarding the multicast traffic received by the old master input.

Preferably, the method embodiment further includes:
if a backup output needs to be switched to a master output, switching the backup output to the master output immediately; and
if a master output needs to be switched to a backup output, switching the master output to the backup output in a delayed manner.

Figure 3A:
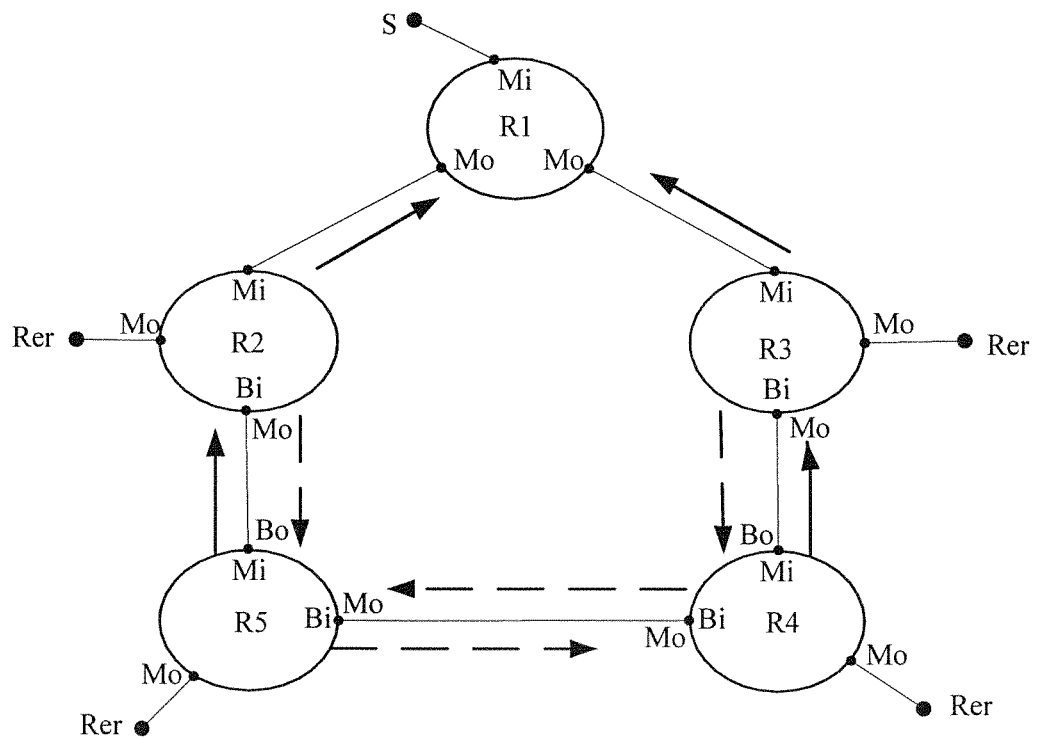

Specifically, nodes R2 to R5 in FIG. 1a are used as an example to describe a process of defining a role of an interface, the process of defining a role of an interface is also applicable to another complex network whose implementation process is similar, and details are not described herein again. After each node determines primary and secondary paths to S, an interface toward an upstream neighboring node of the primary path is used as a master input (Mi) and an interface toward an upstream neighboring node of the secondary path is used as a backup input (Bi) according to traffic directions. PIM join packets join are sent to the upstreams of the primary and secondary paths by using the master and backup inputs respectively, so that the upstream nodes mark master outputs and backup outputs according to interfaces receiving the PIM join packets. Then, according to the received join packets sent by the downstream neighboring nodes, corresponding master outputs (Mo) and corresponding backup outputs (Bo) are marked: if an interface receiving the PIM join packet is not a master input Mi, the interface is marked as a master output Mo, and if the interface receiving the PIM join packet is a master input Mi, the interface is marked as a backup output Bo. It should be noted herein that, if receiving an IGMP join packet sent by Rer, an interface connected to Rer is marked as a master output Mo. According to the foregoing rule of defining a role of an interface, a schematic diagram of defined roles of interfaces of R2 to R5 in FIG. 1a is shown in FIG. 3a, where an arrowed solid-line denotes a direction in which a PIM join packet is sent to an upstream node of a primary path, and an arrowed dashed-line denotes a direction in which a PIM join packet is sent to an upstream node of a secondary path. After the roles of the interfaces are defined, each node replicates multicast traffic received by a master input to a master output, and replicates, to a backup output, multicast traffic received by a backup input. If a backup output does not exist, the multicast traffic received by the backup input is discarded, and if the master input is faulty, the backup input is switched to the master input, and the multicast traffic received by the backup input that has not undergone switching is replicated to the master output.

Figure 3B:
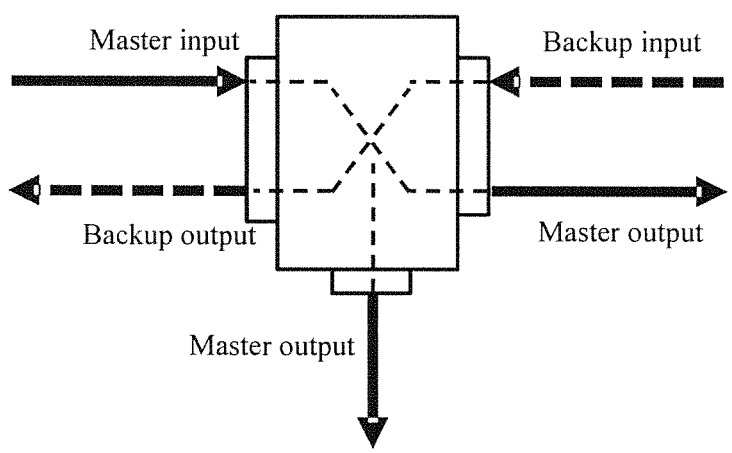

FIG. 3b is a schematic diagram of an interface role of any node in the diagram of the network topology shown in FIG. 1a. The routing node may be a routing node R4 or R5 in FIG. 1a that has primary and secondary paths, and downstream nodes and receivers Rer of the primary and secondary paths. As shown in FIG. 3b, the node has four interface roles: a master input connected to an upstream of the primary path, and configured to receive, by using the master input, multicast traffic replicated by an upstream node of the primary path; a master output connected to a downstream node or a receiver Rer of the primary path, and configured to replicate multicast traffic to a downstream node of the primary path by using the master output, where a transmission direction of the multicast traffic of the primary path is shown by a thick solid-line in FIG. 3b; a backup input connected to an upstream of the secondary path, and configured to receive, by using the backup input, multicast traffic replicated by an upstream node of the secondary path; a backup output connected to a downstream node of the secondary path, and configured to replicate multicast traffic to a downstream node of the secondary path by using the backup output, where a transmission direction of the multicast traffic of the secondary path is shown by a thick dashed-line in FIG. 3b. It should be noted that, in an annular network topology, an upstream node of the foregoing primary path may be a downstream node of the secondary path, and an upstream node of the secondary path may be a downstream node of the primary path.

Figure 3C:
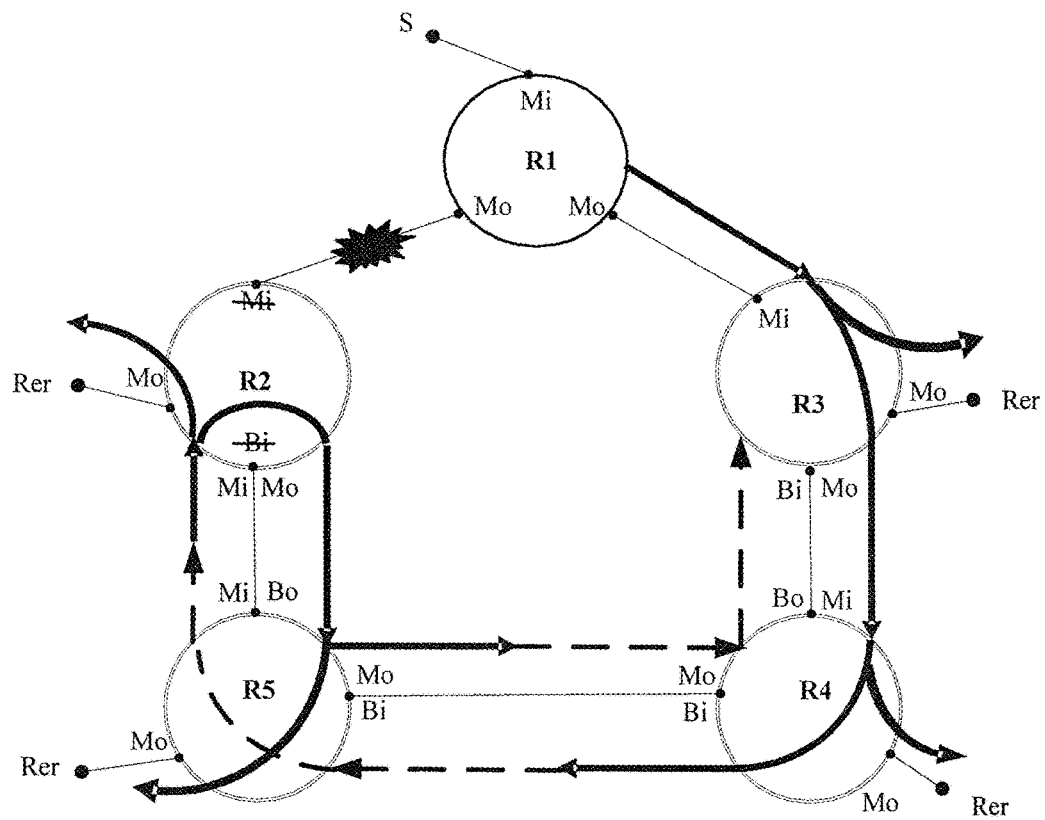
FIG. 3c is a schematic diagram of a network topology in which a master input is faulty in the method embodiment shown in FIG. 3.

FIG. 3c is a schematic diagram of a network topology in which a master input is faulty in the method embodiment shown in FIG. 3. An example in which a fault occurs in a network link between R1 and R2 is used to describe a process of fast protection switching of the method embodiment, processes of fast protection switching for other fault points (except a fault point between a source node S and R1) are similar to the process, and details are not described herein again. As shown in FIG. 3b, an arrowed solid-line denotes multicast traffic of a primary path, and an arrowed dashed-line denotes that after an interface role of each node is defined, a link between R1 and R2 is faulty, and therefore a fault point R2 may immediately perceive that a master input Mi is faulty, where a specific perception technology is not limited in the present invention. The master input Mi receives no multicast traffic; in this case, the fault point R2 directly triggers input role switching, a backup input Bi is immediately switched to a master input Mi, and multicast traffic received by the backup input Bi from R5 before the switching is replicated to all master outputs Mo, including performing replication to R5 by using the master output Mo. In this case, the node R5 does not need to perceive that the primary path is faulty, and can still receive multicast traffic from a master input Mi. However, in MoFRR in the prior art, if the primary path is faulty, the node R5 needs to learn by means of IGP protocol convergence or traffic triggering that the primary path is faulty. However, the IGP convergence easily brings about a problem of a long switching time, and in a case of the traffic triggering, because multicast traffic itself may be interrupted, erroneous switching is easily caused. After protection switching is performed on the fault point, the fault point may diffuse fault information by means of IGP, so that other routing nodes perform convergence, and calculate primary and secondary paths again, and finally the entire network is converged. After the entire network is converged, a scenario in which the primary and secondary paths change exists. In this case, if the master input changes, multicast traffic received by a new master input is replicated to a downstream neighboring node by using the master output, and it is determined whether the old master input is a new backup input: if the old master input is a new backup input, the old master input is switched to a backup input, and multicast traffic received by the old master input that has not undergone switching is replicated to the downstream neighboring node by using a backup output; otherwise, a PIM prune message is sent to the old master input, the old master input is deleted, and the multicast traffic received by the old master input is discarded. If a backup output needs to be switched to a master output, the backup output is switched to the master output immediately. If a master output needs to be switched to a backup output, the master output is switched to the backup output in a delayed manner. A hold-timer (hold-timer) may be set, and an output role is switched only after the hold-timer expires, so as to ensure that traffic of a neighboring node of the master output is not interrupted.

During specific implementation, after determining the primary and secondary paths, each routing node sends the PIM join packet join to the upstream node by using inbound interfaces including the master input and the backup input, so that the upstream node marks corresponding outbound interfaces including the master output and the backup output, receives multicast traffic on the inbound interface and then replicates the multicast traffic to the corresponding outbound interfaces. Moreover, when needing to leave the multicast network, each routing node may send the PIM prune (prune) message to an upstream node of the primary and secondary paths, so that after receiving the PIM prune message prune, the upstream node deletes a corresponding outbound interface, and determines whether another outbound interface including a master output and a backup output exists. If the master output does not exist, a PIM prune message is also sent to the upstream by using a master input . If the backup output does not exist, a PIM prune message is also sent to the upstream by using a backup input.

In this embodiment, on the basis of Embodiment 1 of the method shown in FIG. 1 or FIG. 2, a definition of an interface role is added, and a fault point directly triggers interface role switching to perform protection switching, so as to implement fast protection on all downstream nodes of a primary path of the fault point, which does not involve a fault transfer problem, improves efficiency of protection switching when a fault occurs, and can avoid erroneous switching.

Figure 4:
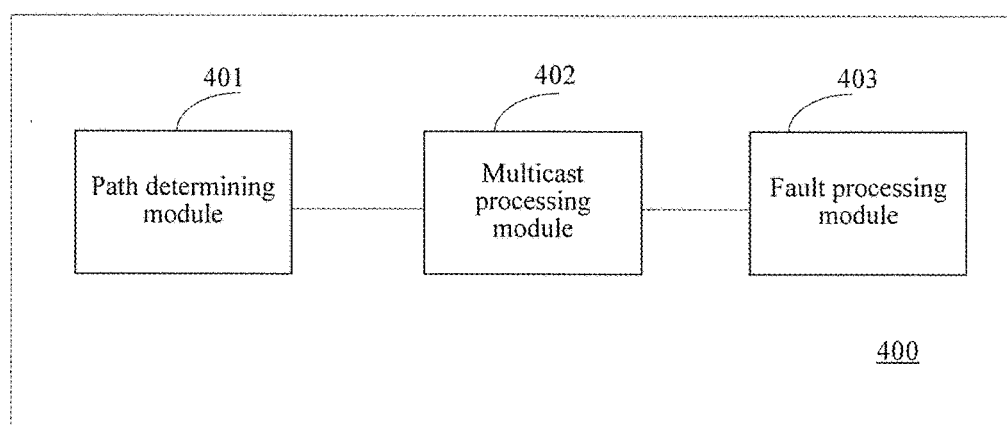
FIG. 4 is a schematic structural diagram of Embodiment 1 of an apparatus for fast protection switching in multicast according to the present invention.

FIG. 4 is a schematic structural diagram of Embodiment 1 of an apparatus for fast protection switching in multicast according to the present invention. As shown in FIG. 4, the apparatus 400 for fast protection switching in multicast includes: a path determining module 401, a multicast processing module 402, and a fault processing module 403, where the path determining module 401 is configured to determine a primary path and a secondary path to a source node, where the secondary path and the primary path have minimum tail coincidence;

the multicast processing module 402 is configured to receive, by using both the primary path and the secondary path, multicast traffic replicated by an upstream neighboring node, and replicate multicast traffic received by the primary path to a downstream neighboring node; and the fault processing module 403 is configured to: if the primary path is faulty, replicate multicast traffic received by the secondary path to the downstream neighboring node.

Further, the path determining module 401 is specifically configured to:

determine a shortest path to the source node as the primary path;

determine whether a path to the source node exists exclusive of the primary path; and if the path to the source node exists exclusive of the primary path, use a shortest path of the path as the secondary path, if the path to the source node does not exist exclusive of the primary path, use a last hop of the primary path as a last hop of the secondary path, and perform the step of determining the secondary path to the source node;

if the last hop Nx of the primary path is used as the last hop of the secondary path and the secondary path to the source node does not exist, use last two hops of the primary path as last two hops of the secondary path, and perform the step of determining the secondary path; and if the last two hops of the primary path are used as the last two hops of the secondary path and the secondary path to the source node does not exist, deduce the rest by analogy until the secondary path to the source node is determined.

Preferably, the path determining module 401 is further configured to: after determining the secondary path to the source node, form a first set by using all nodes on a secondary path;

use the last hop Nx of the primary path as a root, determine all subtrees on a reverse shortest path tree RSPT that uses the last hop Nx of the primary path as the root, and form a second set by using nodes on all the subtrees;

if an intersection set of the second set and the first set is not empty, determine a farthest node Nj on the secondary path in the intersection set; and replace the secondary path with a path formed by using all nodes on a subtree of the node Nj on the reverse shortest path tree RSPT and all nodes between the node Nj and the source node on the secondary path, and use the formed path as a final secondary path to the source node.

The apparatus embodiment may be used for performing the technical solution in the method embodiment shown in FIG. 1 or FIG. 2, and has an implementation principle and a technical effect similar to those of the method embodiment, and details are not described herein again.

Figure 5:
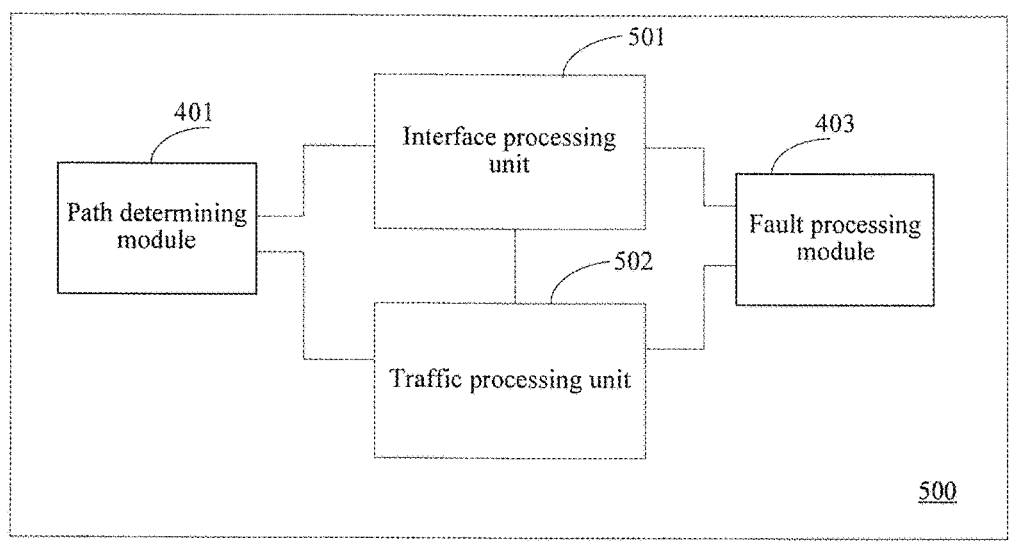
FIG. 5 is a schematic structural diagram of Embodiment 2 of an apparatus for fast protection switching in multicast according to the present invention.

FIG. 5 is a schematic structural diagram of Embodiment 2 of an apparatus for fast protection switching in multicast according to the present invention. This embodiment is a specific implementation manner of the multicast processing module 402 in the apparatus embodiment shown in FIG. 4. As shown in FIG. 5, the apparatus 500 for fast protection switching in multicast includes the path determining module 401 and the fault processing module 403 in the apparatus embodiment shown in FIG. 4, and has an implementation principle similar to that of the apparatus embodiment shown in FIG. 4, and details are not described herein again. The apparatus 500 for fast protection switching in multicast further includes: an interface processing unit 501 and a traffic processing unit 502, where the interface processing unit 501 is configured to use an interface between the primary path and the upstream neighboring node as a master input, and use an interface between the secondary path and the upstream neighboring node as a backup input;

the traffic processing unit 502 is configured to receive, by using the master input, the multicast traffic replicated by the upstream neighboring node, receive, by using the backup input, the multicast traffic replicated by the upstream neighboring node, and replicate the multicast traffic received by the master input to the downstream neighboring node; and in this case, correspondingly, the fault processing module 403 is specifically configured to:

if the master input is faulty, replicate the multicast traffic received by the backup input to the downstream neighboring node.

Further, the interface processing unit 501 is further configured to: after using the interface between the primary path and the upstream neighboring node as the master input, and using the interface between the secondary path and the upstream neighboring node as the backup input, receive a PIM join packet;

determine whether an interface receiving the PIM join packet is a master input; and if the interface receiving the PIM join packet is not a master input, mark the interface as a master output;

the traffic processing unit 502 is specifically configured to:

replicate, by using the master output, the multicast traffic received by the master input to the downstream neighboring node; and correspondingly, the fault processing module 403 is specifically configured to:

switch the backup input to a master input, and replicating, by using the master output, the multicast traffic received by the backup input that has not undergone switching to the downstream neighboring node.

Further, the interface processing unit 501 is further configured to:

if the interface receiving the PIM join packet is a master input, mark the interface as a backup output;

the traffic processing unit 502 is further configured to: after receiving, by using the backup input, the multicast traffic replicated by the upstream neighboring node, if the master input is not faulty, replicate, by using the backup output, the multicast traffic received by the backup input to the downstream neighboring node.

Preferably, the interface processing unit 501 is further configured to: after the receiving a PIM join packet, determine whether a master output and/or backup output exists; and if the master output exists, send a PIM join packet to the upstream neighboring node by using the master input; and/or, if the backup output exists, send a PIM join packet to the upstream neighboring node by using the backup input.

Optionally, the interface processing unit 501 is further configured to:

receive a PIM prune message;

delete an outbound interface receiving the PIM prune message, where the outbound interface receiving the PIM prune message is a master output or backup output;

determine whether a master output and/or backup output exists; and if the master output does not exist, send a PIM prune message to the upstream node by using the master input, and/or if the backup output does not exist, send a PIM prune message to the upstream neighboring node by using the backup input.

Further, the traffic processing unit 502 is further configured to: after receiving, by using the master input, the multicast traffic replicated by the upstream neighboring node, and receiving, by using the backup input, the multicast traffic replicated by the upstream neighboring node, and before replicating the multicast traffic received by the master input to the downstream neighboring node, perform, according to the primary path, reverse path forwarding RPF check on the multicast traffic replicated by the upstream neighboring node and received by the master input; and perform, according to the secondary path, reverse path forwarding RPF check on the multicast traffic replicated by the upstream neighboring node and received by the backup input.

Further, the traffic processing unit 502 is further configured to: before replicating, by using the backup output, the multicast traffic received by the backup input to the downstream neighboring node if the master input is not faulty, determine whether a backup output exists; and if the backup output does not exist, discard the multicast traffic received by the backup input.

Optionally, the interface processing unit 501 is further configured to:

if the master input changes, replicate, by using the master output, multicast traffic received by a new master input to the downstream neighboring node;

determine whether the old master input is a new backup input; and if the old master input is a new backup input, switch the old master input to the backup input, and the traffic processing unit 502 is further configured to:

replicate, by using a backup output, the multicast traffic received by the old master input that has not undergone switching to the downstream neighboring node; or if the old master input is not a new backup input, send a PIM prune message to the old master input, and delete the old master input, and the traffic processing unit 502 is further configured to:

discard the multicast traffic received by the old master input.

Optionally, the interface processing unit 501 is further configured to:

if a backup output needs to be switched to a master output, switch the backup output to the master output immediately; and if a master output needs to be switched to a backup output, switch the master output to the backup output in a delayed manner.

The apparatus embodiment may be used for performing the technical solution in the method embodiment shown in FIG. 3, and has an implementation principle and a technical effect similar to those of the method embodiment, and details are not described herein again.

An embodiment of the present invention further provides a network device, including the apparatus 400 for fast protection switching in multicast shown in FIG. 4, or the apparatus 500 for fast protection switching in multicast shown in FIG. 5, that may be separately configured to implement a technical solution in a method embodiment shown in FIG. 1 or FIG. 2 or a technical solution in a method embodiment shown in FIG. 3. The network device has an implementation principle and a technical effect similar to those of the method embodiment, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method for fast protection switching in multicast, the method comprising:

determining a primary path and a secondary path to a source node, wherein the secondary path and the primary path have minimum tail coincidence;

receiving, by using both the primary path and the secondary path, multicast traffic replicated by an upstream neighboring node, and replicating multicast traffic received by the primary path to a downstream neighboring node; and if the primary path is faulty, replicating multicast traffic received by the secondary path to the downstream neighboring node.

2. The method according to claim 1, wherein determining a primary path and a secondary path to a source node, wherein the secondary path and the primary path have minimum tail coincidence, comprises:

determining a shortest path to the source node as the primary path;

determining whether a path to the source node exists exclusive of the primary path;

if at least one path to the source node exists exclusive of the primary path, using a shortest path of the at least one path to the source node as the secondary path; and if the path to the source node does not exist exclusive of the primary path, using a last hop Nx of the primary path as a last hop of the secondary path, and performing the step of determining the secondary path to the source node.

3. The method according to claim 2, further comprising:

if the last hop Nx of the primary path is used as the last hop of the secondary path and the secondary path to the source node does not exist, using last two hops of the primary path as last two hops of the secondary path, and performing the step of determining the secondary path; and if the last two hops of the primary path are used as the last two hops of the secondary path and the secondary path to the source node does not exist, deducing the rest by analogy until the secondary path to the source node is determined.

4. The method according to claim 2, wherein after determining the secondary path to the source node, the method further comprises:

forming a first set by using all nodes on the secondary path;

using the last hop Nx of the primary path as a root, determining all subtrees on a reverse shortest path tree (RSPT) that uses the last hop Nx of the primary path as the root, and forming a second set by using nodes on all the subtrees;

if an intersection set of the second set and the first set is not empty, determining a farthest node Nj on the secondary path in the intersection set; and replacing the secondary path with a path formed by using all nodes on a subtree of the node Nj on the RSPT and all nodes between the node Nj and the source node on the secondary path, and using the formed path as a final secondary path to the source node.

5. The method according to claim 1, wherein:
receiving, by using both the primary path and the secondary path, multicast traffic replicated by an upstream neighboring node, and replicating multicast traffic received by the primary path to a downstream neighboring node comprises:
  using an interface between the primary path and the upstream neighboring node as a master input, and using an interface between the secondary path and the upstream neighboring node as a backup input, and
  receiving, by using the master input, the multicast traffic replicated by the upstream neighboring node, receiving, by using the backup input, the multicast traffic replicated by the upstream neighboring node, and replicating the multicast traffic received by the master input to the downstream neighboring node; and
if the primary path is faulty, replicating multicast traffic received by the secondary path to the downstream neighboring node comprises:
  if the master input is faulty, replicating the multicast traffic received by the backup input to the downstream neighboring node.

6. The method according to claim 5, wherein:
after using an interface between the primary path and the upstream neighboring node as a master input, and using an interface between the secondary path and the upstream neighboring node as a backup input, the method further comprises:
  receiving a Protocol Independent Multicast (PIM) join packet,
  determining whether an interface receiving the PIM join packet is a master input, and
  if the interface receiving the PIM join packet is not a master input, marking the interface as a master output;
replicating the multicast traffic received by the master input to the downstream neighboring node comprises:
  replicating, by using the master output, the multicast traffic received by the master input to the downstream neighboring node; and
  if the master input is faulty, replicating the multicast traffic received by the backup input to the downstream neighboring node comprises:
    switching the backup input to a master input, and replicating, by using the master output, the multicast traffic received by the backup input that has not undergone switching to the downstream neighboring node.

7. The method according to claim 6, further comprising:
if the interface receiving the PIM join packet is a master input, marking the interface as a backup output; and
after receiving, by using the backup input, the multicast traffic replicated by the upstream neighboring node, the method further comprises:
  if the master input is not faulty, replicating, by using the backup output, the multicast traffic received by the backup input to the downstream neighboring node.

8. The method according to claim 7, wherein after receiving a PIM join packet, the method further comprises:
  determining whether a master output and/or backup output exists; and
  if the master output exists, sending a PIM join packet to the upstream neighboring node by using the master input, and/or if the backup output exists, sending a PIM join packet to the upstream neighboring node by using the backup input.

9. The method according to claim 7, further comprising:
  if the master input changes, replicating, by using the master output, multicast traffic received by a new master input to the downstream neighboring node;
  determining whether the old master input is a new backup input;
  if the old master input is a new backup input, switching the old master input to the backup input, and replicating, by using a backup output, the multicast traffic received by the old master input that has not undergone switching to the downstream neighboring node; and
  if the old master input is not a new backup input, sending a PIM prune message to the old master input, deleting the old master input, and discarding the multicast traffic received by the old master input.

10. The method according to claim 6, further comprising:
  receiving a PIM prune message;
  deleting an outbound interface receiving the PIM prune message, wherein the outbound interface receiving the PIM prune message is a master output or backup output;
  determining whether a master output and/or backup output exists; and
  if the master output does not exist, sending a PIM prune message to the upstream node by using the master input, and/or if the backup output does not exist, sending a PIM prune message to the upstream neighboring node by using the backup input.

11. An apparatus for fast protection switching in multicast, the apparatus comprising:
  a processor; and
  a non-transitory computer-readable storage medium coupled to the processor and storing programming instructions which, when executed, cause the processor to:
    determine a primary path and a secondary path to a source node, wherein the secondary path and the primary path have minimum tail coincidence,
    receive, by using both the primary path and the secondary path, multicast traffic replicated by an upstream neighboring node, and replicate multicast traffic received by the primary path to a downstream neighboring node, and
    if the primary path is faulty, replicate multicast traffic received by the secondary path to the downstream neighboring node.

12. The apparatus according to claim 11, wherein the programming instructions further cause the processor to:
  determine a shortest path to the source node as the primary path;
  determine whether a path to the source node exists exclusive of the primary path;
  if at least one path to the source node exists exclusive of the primary path, use a shortest path of the at least one path to the source node as the secondary path; and
  if the path to the source node does not exist exclusive of the primary path, use a last hop Nx of the primary path as a last hop of the secondary path, and perform the step of determining the secondary path to the source node.

13. The apparatus according to claim 12, wherein the programming instructions further cause the processor to:
  if the last hop Nx of the primary path is used as the last hop of the secondary path and the secondary path to the source node does not exist, use last two hops of the primary path as last two hops of the secondary path, and perform the step of determining the secondary path; and if the last two hops of the primary path are used as the last two hops of the secondary path and the secondary path to the source node does not exist, deduce the rest by analogy until the secondary path to the source node is determined.

14. The apparatus according to claim 12, wherein the programming instructions further cause the processor to:

after determining the secondary path to the source node, form a first set by using all nodes on the secondary path;

use the last hop Nx of the primary path as a root, determine all subtrees on a reverse shortest path tree (RSPT) that uses the last hop Nx of the primary path as the root, and form a second set by using nodes on all the subtrees;

if an intersection set of the second set and the first set is not empty, determine a farthest node Nj on the secondary path in the intersection set; and replace the secondary path with a path formed by using all nodes on a subtree of the node Nj on the RSPT and all nodes between the node Nj and the source node on the secondary path, and use the formed path as a final secondary path to the source node.

15. The apparatus according to claim 11, wherein the programming instructions further cause the processor to:

use an interface between the primary path and the upstream neighboring node as a master input, and use an interface between the secondary path and the upstream neighboring node as a backup input;

receive, by using the master input, the multicast traffic replicated by the upstream neighboring node, receive, by using the backup input, the multicast traffic replicated by the upstream neighboring node, and replicate the multicast traffic received by the master input to the downstream neighboring node; and if the master input is faulty, replicate the multicast traffic received by the backup input to the downstream neighboring node.

16. The apparatus according to claim 15, wherein the programming instructions further cause the processor to:

after using the interface between the primary path and the upstream neighboring node as the master input and using the interface between the secondary path and the upstream neighboring node as the backup input, receive a Protocol Independent Multicast (PIM) join packet;

determine whether an interface receiving the PIM join packet is a master input;

if the interface receiving the PIM join packet is not a master input, mark the interface as a master output;

replicate, by using the master output, the multicast traffic received by the master input to the downstream neighboring node; and switch the backup input to a master input, and replicate, by using the master output, the multicast traffic received by the backup input that has not undergone switching to the downstream neighboring node.

17. The apparatus according to claim 16, wherein the programming instructions further cause the processor to:

if the interface receiving the PIM join packet is a master input, mark the interface as a backup output; and after receiving, by using the backup input, the multicast traffic replicated by the upstream neighboring node, if the master input is not faulty, replicate, by using the backup output, the multicast traffic received by the backup input to the downstream neighboring node.

18. The apparatus according to claim 17, wherein the programming instructions further cause the processor to:

after the receiving a PIM join packet, determine whether a master output and/or backup output exists; and if the master output exists, send a PIM join packet to the upstream neighboring node by using the master input, and/or if the backup output exists, send a PIM join packet to the upstream neighboring node by using the backup input.

19. The apparatus according to claim 17, wherein the programming instructions further cause the processor to:

if the master input changes, replicate, by using the master output, multicast traffic received by a new master input to the downstream neighboring node;

determine whether the old master input is a new backup input;

if the old master input is a new backup input, switch the old master input to the backup input and replicate, by using a backup output, the multicast traffic received by the old master input that has not undergone switching to the downstream neighboring node; and if the old master input is not a new backup input, send a PIM prune message to the old master input, and delete the old master input, and discard the multicast traffic received by the old master input.

20. The apparatus according to claim 16, wherein the programming instructions further cause the processor to:

receive a PIM prune message;

delete an outbound interface receiving the PIM prune message, wherein the outbound interface receiving the PIM prune message is a master output or backup output;

determine whether a master output and/or backup output exists; and if the master output does not exist, send a PIM prune message to the upstream node by using the master input, and/or if the backup output does not exist, send a PIM prune message to the upstream neighboring node by using the backup input.

* * * * *